United States Patent Office 3,317,465
Patented May 2, 1967

3,317,465
COMBINATION CATALYST-INHIBITOR FOR BETA-HYDROXY CARBOXYLIC ESTERS
Thomas E. Doyle, Pittsburgh, Frank Fekete, Monroeville, Patrick J. Keenan, Pittsburgh, and William J. Plant, Monroeville, Pa., assignors to H. H. Robertson Company, Pittsburgh, Pa., a corporation of Pennsylvania
No Drawing. Filed June 26, 1963, Ser. No. 290,591
8 Claims. (Cl. 260—47)

This invention concerns the preparation of beta-hydroxy carboxylic acid esters by reaction of an epoxide with a carboxylic acid, and the stabilization of the resulting esters. More particularly this invention concerns the catalysts of the esterification reaction with mixtures of triphenyl stibine and triphenyl phosphine.

PRIOR ART

The reaction of epoxide groups

with carboxylic acid groups

yields beta-hydroxy carboxylic esters

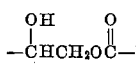

This reaction is utilized in the preparation of polyacrylate esters, for example, the ester reaction product of two mols methacrylic acid and one mol diglycidyl ether of Bisphenol-A.

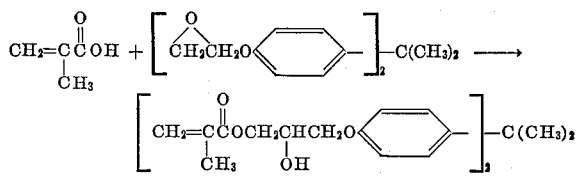

The ester reaction product is a useful thermosetting polymerizable dimethacrylate diester diether which has found utility in resin casting and laminating both as homopolymer and in combination with other ethylenically unsaturated resins and monomers as a copolymer constituent.

Heretofore these esters have been prepared through the use of tert-amines as catalyst with the inclusion of some vinyl polymerization inhibitor such as hydroquinone. The storage life of such ester products has been limited. The color of the product esters has not been a desirable water-white. The presence of inhibitors has interfered somewhat with the curing properties of the product esters.

THE PRESENT INVENTION

According to this invention, the ester-forming reaction between an epoxide and a carboxylic acid is catalyzed by a mixture of triphenyl stibine and triphenyl phosphine. The reaction proceeds rapidly at suitably low temperatures, e.g., about 100° C. to yield relatively colorless ester products in substantially quantitative recovery. Where the product ester contains ethylenically unsaturated >C=CH₂ bonds, the product possesses excellent storage life. Such ester products are polymerizable (homopolymerizable and copolymerizable with other ethylenically unsaturated resins and monomers) with the familiar peroxy polymerization initiators. The need for extraneous polymerization inhibitors such as the familiar quinone and hydroquinone inhibitors is eliminated with the present catalyst mixture. The absence of quinone-forming inhibitors is believed to contribute to the relative colorless appearance of the esters and the cured polymerization products since it is known that quinoid inhibitors tend to darken cured resins.

THE EPOXIDE

Epoxide groups appear in a variety of compounds. Those of interest herein include compounds having a terminal epoxide group

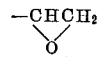

for example, alkylene oxides such as ethylene oxide, propylene oxide, 1,2-butylene oxide; glycidyl compounds such as glycidyl acrylate, glycidyl methacrylate, allyl glycidyl ether; diglycidyl epoxy resins

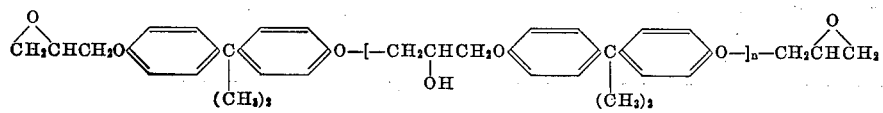

wherein $n$ is an integer from zero through five; epoxidized phenolformaldehyde novolac resins

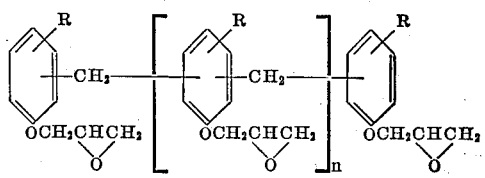

wherein R is a substituent selected from the class consisting of hydrogen and lower alkyl radicals having from one to four carbon atoms and $n$ is an integer from zero to five; and the like.

THE CARBOXYLIC ACID

Preferred carboxylic acids are mono- and di-carboxylic acids possessing alpha-beta ethylenic unsaturation. Typical mono-carboxylic acids having alpha-beta ethylenic unsaturation include acrylic acid, methacrylic acid, cinnamic acid, higher alkylated acrylic acids such as ethyl, propyl, butyl substituted acrylic acids, and the like.

Preferred dicarboxylic acids include the ethylenically unsaturated acids: maleic acid and fumaric acid.

Saturated carboxylic acids are also of interest in this invention, for example, acetic acid, and other saturated carboxylic acids of the paraffin series of compounds, aryl carboxylic acids such as benzoic acid, ring substituted benzoic acids, and dicarboxylic acids such as phthalic acid, isophthalic acid, terephthalic acid, adipic acid, oxalic acid, succinic acid, naphthalene-2,6-dicarboxylic acid, and the like. The saturated carboxylic acids may be used for the preparation of ethylenically unsaturated polymerizable substances through reaction with such epoxides as glycidyl acrylate, allyl glycidyl ether, glycidyl methacrylate, for example.

GENERAL

The reaction between an epoxide group

and a carboxylic acid group —COOH preceeds in the presence of a variety of catalysts. Triethylamine has been successfully utilized. The reaction likewise proceeds with triphenyl phosphine, triphenyl stibine and triphenyl antimony. The reaction rate of these last three is triphenyl phosphine>triphenyl arsine>triphenyl stibine. A typical reaction involving an epoxide

and methacrylic acid was conducted with the following four materials as catalysts for comparison: triethylamine, triphenyl phosphine, triphenyl arsine and triphenyl stibine. The acid number of the product increased in the order mentioned. The stability of the uninhibited ester product (alone and diluted with 20 percent styrene) increased in the order mentioned.

| Catalyst | Final Acid Number | Reaction Time, hours | 70° C. stability— | |
|---|---|---|---|---|
| | | | Resin alone | Diluted with Styrene |
| Triethylamine | 5 | 6 | 17 hrs | 16.5 hrs. |
| Triphenyl phosphine | 1.9 | 4 | 19 hrs | 19 hrs. |
| Triphenyl arsine | 3.2 | 4 | 73 days | 24 hrs. |
| Triphenyl stibine: | | | | |
| (a) | 14.2 | 7 | }6 months | 12.6 days. |
| (b) | 12.1 | 10 | | |

In all cases the catalyst was 40 millimols based upon the reactants. The reaction temperature was 100° C. in all instances.

The product esters of the triethylamine and triphenyl phosphine catalyzed reactions require added polymerization inhibitor to achieve a suitable storage life. The product ester obtained from the triphenyl stibine has excellent storage properties, although the reaction does not proceed to substantial completion in an acceptable period of time.

According to this invention, a mixture of triphenyl phosphine and triphenyl stibine achieves a substantially complete reaction and produces a product ester having suitable storage properties. The following Example 1 compares the catalytic properties of triphenyl phosphine, triphenyl stibine and their mixtures.

*Example 1.*—A polymerizable thermosetting resin was prepared by reaction of acrylic acid with the diglycidyl ether of Bisphenol-A.

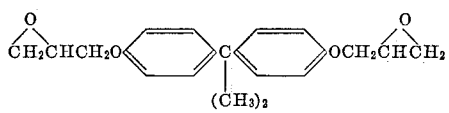

The diglycidyl ether of Bisphenol-A is commercially available under various tradenames. Two epoxy equivalents (one mol) of the diglycidyl ether of Bisphenol-A (346 grams) were mixed with two mols methacrylic acid (172 grams) along with one weight percent triphenyl stibine (5.2 grams). The reaction mixture was heated at 100° C. for ten hours until the acid number diminished to 27. After twelve hours, the acid number had diminished to 23. After fourteen hours, the acid number diminished to 22.5, indicating that the reaction had not been completed.

Without added inhibitor, however, the product resin had a shelf life at 70° C. exceeding six months. The shelf life of a mixture of the resin with 20 percent styrene had a shelf life at 70° C. for 15 days.

The identical reactants were combined with a variety of catalysts to produce a similar product resin. The reaction details product properties are set forth in the following table:

| | Ratio, $\phi_3Sb/\phi_3P$ | Reaction time, hrs. | Final Acid Value | Product, 70° C. stability, days | Product and 20 percent styrene, 70° C. stability, days |
|---|---|---|---|---|---|
| Resin: | | | | | |
| (a) | 0/4 | 6 | 5.7 | 2–3 | 0–1 |
| (b) | 1/3 | 7 | 6.2 | 113 | 2–3 |
| (c) | 2/2 | 12 | 6 | 120 | 3–4 |
| (d) | 3/1 | 8 | 7.9 | 120 | 14–15 |
| (e) | 4/0 | 14 | 22.6 | 120 | 20 |

NOTE.—$\phi_3Sb$ indicates triphenyl stibine; $\phi_3P$ indicates triphenyl phosphine. Resins a, b and c were prepared at 100° C.; resins d and e were prepared at 110° C.

Thus the present ester reaction products possess satisfactory storage life with the mixture of triphenyl stibine and triphenyl phosphine. Note, for example that resin (a) possesses an unsatisfactory stability. Inclusion of conventional quinoid polymerization inhibitors into the resin (a) will achieve greater storage life at the expense of the resin color characteristics.

Resin (e) indicates that incomplete reaction is achieved between the reactants when triphenyl stibine alone is selected as a catalyst, although the storage properties of the resulting material are excellent.

The resins (b), (c), and especially (d) indicate the desirable catalysis accompanied with satisfactory storage life for the resulting resin which is achieved through the present invention. Homopolymers and copolymers of the resins (a), (b), (c), (d), (e) were less discolored than comparable polymers prepared from quinoid-inhibited resins.

*Example 2.*—A polymerizable thermosetting resin was prepared by reaction of acrylic acid and the epoxidized phenol-formaldehyde novalac resin

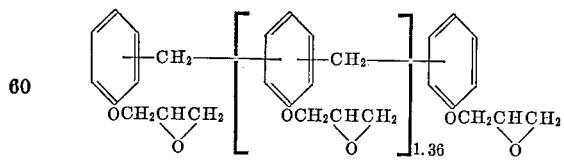

The epoxidized phenol-formaldehyde novalac resin is commercially available from Dow Chemical Company under the tradename DEN–438. Its epoxy equivalent is about 175–180. Two equivalents of the epoxidized novalac resin (360 grams) were mixed with two equivalents of acrylic acid (144 grams) in a flask. The catalyst was 0.75 weight percent triphenyl stibine (3.78 grams) and 0.25 weight percent triphenyl phosphine (1.26 grams). The mixture was heated at 120° C. for four hours until the acid number diminished to 5.2. After a total of seven hours heating, the acid number was 1.3 indicating substantially complete reaction. The product resin was readily homopolymerizable in the presence of the usual peroxy polymerization initiators. The product resin likewise was readily copolymerizable with styrene, vinyl toluene, diallyl phthalate, ethylene-glycol-dimethacrylate and similar ethylenically unsaturated monomers. The product resin was nearly water-white in color. The homopolymers and copolymers were not so discolored as those prepared from the similar reaction product made with triethylamine as catalyst.

*Example 3.*—Addition of glycidyl methacrylate to dimer acid. Dimer acid is a long-chain aliphatic acid having the formula $(C_nH_{2n})$—$(COOH)_2$ wherein $n$ is approximately 34. A specific dimer acid supply had a molecular weight of 550.4. One-quarter-equivalent of that dimer acid (137.6 grams) was mixed with one-half equivalent glycidyl methacrylate (71 grams) and 0.25 weight percent triphenyl phosphine (0.52 grams) and 0.75 weight per cent triphenyl stibine (1.56 grams). The mixture was heated at 100° C. for four hours to a final acid number of 11.8. The product viscosity was 2560 cps. The material readily cures with peroxy catalysts to form a flexible homopolymer. The product is

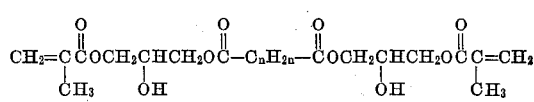

wherein $n$ is an integer approximately 34.

*Example 4.*—Addition of glycidyl methacrylate to phthalic acid. One-half equivalent phthalic acid (83 grams) was mixed with one equivalent glycidyl methacrylate (142 grams). A catalyst mixture was added consisting of 0.25 weight percent triphenyl phosphine (0.56 gram) and 0.75 weight percent triphenyl stibine (1.69 grams). The mixture was heated at 100° C. for twelve hours to a final acid number of 6.6. The product viscosity (at 70° C.) was 2560 centipoises. The product resin readily cured with peroxy catalysts to form a hard homopolymer having a Barcol hardness from 45 to 50. The product was

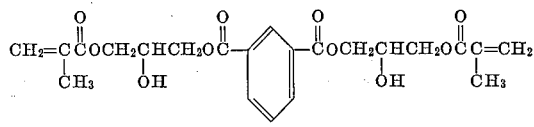

*Example 5.*—Addition of methacrylic acid to propylene oxide. Four equivalents methacrylic acid (344 grams) were mixed with four equivalents plus one percent propylene oxide (235 grams). The catalyst was 80 millimols triphenyl stibine (28.2 grams). The mixture was heated at 85–90° C. for thirteen hours to a final acid number of 38.5. The product was a water-white liquid obtained in 89 percent of theoretical yield, beta-hydroxypropyl methacrylate

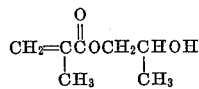

The reaction of Example 5 proceeds to substantial completion with the present catalyst, i.e., a mixture of triphenyl phosphine and triphenyl stibine achieving nearly theoretical yields of the desired product.

In addition, ethylene oxide and 1,2-butylene oxides can be reacted with methacrylic acid to produce beta-hydroxyethyl methacrylate and beta-hydroxybutyl methacrylate respectively. Acrylic acid may be substituted for the methacrylic acid with good results.

In all of the foregoing examples, an epoxy group reacts with a carboxylic acid group to produce a beta-hydroxy alkyl ester:

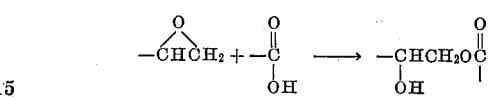

That reaction proceeds readily initially. However in the terminal stages of the reaction, when most of the carboxylic acid groups have been consumed, there are numerous beta-hydroxy alkyl esters in the reaction mixture which can themselves react with the epoxy groups, thus:

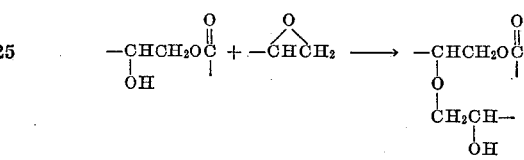

This etherification reaction can be predominant in the terminal portion of the reaction sequence and is one possible reason why prior workers have experienced great difficulty in achieving high purity carboxylic acid esters via the epoxy-acid reaction. We have found that the present mixed catalyst is highly selective toward the esterification reaction which is desired and does not tend to promote the undesired etherification process. To demonstrate the remarkable selectivity, we have attempted to carry out the etherification reaction between allyl alcohol and the diglycidyl ether of Bisphenol-A, thus:

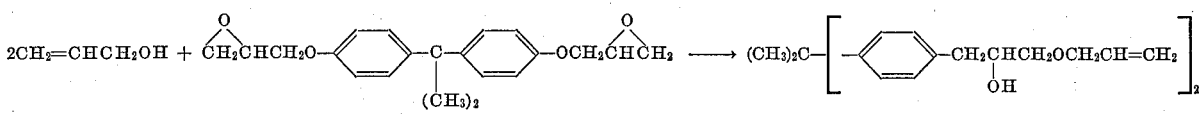

To compare the activity of various catalysts toward this etherification reaction, the following reactants were combined:

|  | Grams |
|---|---|
| 0.5 mol diglycidyl ether of Bisphenol-A | 173 |
| 1.0 mol allyl alcohol | 58 |
| 1 weight percent catalyst (if used) | 2.3 |

Five mixtures were prepared as follows:
(A) Triethylamine catalyst.
(B) Triphenylphosphine catalyst.
(C) Triphenylstibine catalyst.
(D) Mixed catalyst containing three parts by weight of triphenylstibine and one part by weight of triphenylphosphine.
(E) No catalyst (to establish "control" values).

All of the five mixtures were heated at 100° C. for twelve hours. Thereafter each mixture was allowed to cool to room temperature and its viscosity was measured as a parameter of the degree of reaction. The results are set forth in the following table.

| Mixture | Catalyst | Room Temp. Viscosity, cps. | Remarks |
|---|---|---|---|
| (A) | Triethylamine | >100,000 | Violent exotherm at start of reaction; external cooling required to maintain temperature. |
| (B) | Triphenylphosphine | 1,065 | No noticeable exotherm. |
| (C) | Triphenylstibine | 329 | Do. |
| (D) | Mixture of triphenyl phosphine and triphenylstibine. | 165 | Do. |
| (E) | No catalyst | 14 | Do. |

The product mixture from (A) was tested for epoxy content which revealed 0.0036 epoxy equivalent per 100 grams, corresponding to about 99 percent epoxy consumption.

These data dramatically illustrate the effectiveness of the present catalyst mixture in limiting the undesired side reaction which can otherwise occur in the present reaction system involving carboxylic acids and epoxy groups. Thus the present catalyst is effective in the production of beta-hydroxy carboxylic acid esters in high yield in the substantial absence of beta-ethers.

Preferably the present catalyst mixture contains from 0.1 to 0.9 part by weight triphenyl stibine and the balance, 0.9 to 0.1, triphenyl phosphine. The mixed catalyst is used in amounts ranging from about 0.1 weight percent of the reactants to about 2.0 weight percent of the reactants. About one percent by weight of the reactants is usually effective.

The preferred carboxylic acids in the practice of this invention are those acrylic acids having the formula $$CH_2=C(R)COOH$$

wherein R is a substituent selected from the class consisting of hydrogen, lower alkyl radicals and aryl radicals. Where R is hydrogen, the acid is acrylic acid. Where R is methyl, the acid is methacrylic acid; where R is ethyl, the acid is ethylacrylic acid, et cetera. Where R is a phenyl radical, the acid is cinnamic acid et cetera.

We claim:

1. In the process of reacting an epoxy compound having a terminal epoxide group $$-CHCH_2 \atop \diagdown O \diagup$$

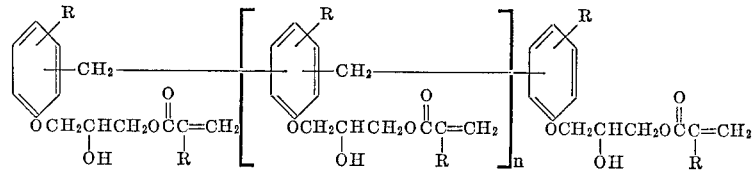

with a carboxylic acid having a terminal $$-COOH$$

group to yield a beta-hydroxy ester having an internal $$-CHCHOC- \atop |\quad\quad \| \atop OH\quad O$$

group, the improvement comprising:
 carrying out the ester formation reaction in the presence of a catalytic amount of a mixture of triphenyl stibine and triphenyl phosphine.

2. In the process of reacting an epoxy compound having a terminal epoxide group $$-CHCH_2 \atop \diagdown O \diagup$$

with an acrylic acid having the formula $$CH_2=C(R)COOH$$

wherein R is a substituent selected from the class consisting of hydrogen, lower alkyl radicals and aryl radicals, to yield a beta-hydroxy ester of the said acrylic acid $$CH_2=C(R)COOCH_2CH- \atop OH$$

the improvement comprising:
 carrying out the ester formation reaction in the presence of a catalytic amount of a mixture of triphenyl phosphine and triphenyl stibine.

3. The improvement of claim 1 wherein the said mixture comprises from ten to ninety percent by weight of triphenyl stibine and the balance triphenyl phosphine, and the said mixture is present in an amount from 0.1 to 2.0 percent by weight of the reactants.

4. The improvement of claim 2 wherein the said mixture comprises from ten to ninety percent by weight of triphenyl stibine and the balance triphenyl phosphine, and the said mixture is present in an amount from 0.1 to 2.0 percent by weight of the reactants.

5. In the process for reacting an alkylene oxide selected from the class consisting of ethylene oxide, propylene oxide and 1,2-butylene oxide with an acrylic acid selected from the class consisting of acrylic acid and methacrylic acid to form a beta-hydroxy alkyl ester of the said acrylic acid, the improvement which comprises:
 admixing the said alkylene oxide and the said acrylic acid in the presence of a catalytic amount of a catalyst mixture of triphenyl stibine and triphenyl phosphine in the substantial absence of quinoid polymerization inhibitor maintaining the admixture at a reaction temperature between room temperature and about 150° C. until the acid number of the said admixture diminishes to a value indicating substantial completion of the reaction, and recovering the resulting ester without deliberate removal of the said catalyst mixture.

6. The polymerizable resinous reaction product of an epoxy resin and an acrylic acid having the formula wherein $n$ is an integer from zero to five and R is a substituent selected from the class consisting of hydrogen and methyl radicals, the said resin containing from about 0.1 to 2.0 percent by weight of a mixture of triphenyl stibine and triphenyl phosphine and being substantially free of quinoid polymerization inhibitors.

7. The polymerizable resinous reaction product of an epoxidized phenol-formaldehyde novalac resin and an acrylic acid having the formula wherein R is a substituent selected from the class consisting of hydrogen and lower alkyl radicals having from one to four carbon atoms and $n$ is an integer from zero to five; the said resin containing from about 0.1 to about 2.0 percent by weight of a mixture of triphenyl phosphine and triphenyl stibine and being substantially free of quinoid polymerization inhibitor.

8. In the process of reacting an epoxy compound having a terminal epoxide group

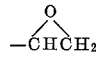

with a carboxylic acid having a terminal

group to produce an internal ester, the improvement which comprises:

carrying out the ester formation reaction in the presence of a catalytic amount of a mixture of triphenyl phosphine and triphenyl stibine, and recovering the product ester substantially free of beta-ethers of alkyl carboxylic esters

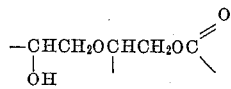

References Cited by the Examiner

UNITED STATES PATENTS

| | | | |
|---|---|---|---|
| 2,768,153 | 10/1956 | Shokal | 260—47 |
| 2,824,851 | 2/1958 | Hall | 260—47 XR |
| 3,059,024 | 10/1962 | Goldberg et al. | 260—486 |
| 3,066,112 | 11/1962 | Bowen | 260—47 XR |

SAMUEL H. BLECH, *Primary Examiner.*

WILLIAM H. SHORT, *Examiner.*

T. D. KERWIN, *Assistant Examiner.*